United States Patent [19]
Russell

[11] Patent Number: 6,030,049
[45] Date of Patent: Feb. 29, 2000

[54] AXIAL WHEEL TRIM RETENTION WITH REDUCED STRESS

[75] Inventor: Martin E. Russell, Hendersonville, Tenn.

[73] Assignee: Del-Met Corporation, Nashville, Tenn.

[21] Appl. No.: 08/990,281

[22] Filed: Dec. 15, 1997

[51] Int. Cl.[7] .................................................. B60B 7/14
[52] U.S. Cl. ........................................................ 301/37.37
[58] Field of Search ............................... 301/37.1, 37.37, 301/108.4

[56] References Cited

U.S. PATENT DOCUMENTS

| | | | |
|---|---|---|---|
| 4,268,090 | 5/1981 | Rush ..................................... | 301/37.37 |
| 5,181,767 | 1/1993 | Hudgins et al. ..................... | 301/37.37 |
| 5,193,884 | 3/1993 | Sheu et al. ........................... | 301/108.4 |
| 5,294,189 | 3/1994 | Price et al. .......................... | 301/37.1 |
| 5,590,992 | 1/1997 | Russell ................................ | 301/37.37 |
| 5,667,281 | 9/1997 | Ladouceur .......................... | 301/37.37 |
| 5,752,794 | 5/1998 | Krawczak ............................ | 301/37.37 |
| 5,842,749 | 12/1998 | DiMarco ............................. | 301/108.4 |

*Primary Examiner*—D. Glenn Dayoan
*Assistant Examiner*—Long Bao Nguyen
*Attorney, Agent, or Firm*—Natter & Natter

[57] ABSTRACT

A wheel cover retention system includes a plurality of apertures for registration with wheel lug nuts. A lug nut cap coupling member is carried in each aperture. The cap includes external threads which engage internal threads of the aperture and internal threads which engage external threads formed on the lug nut. The rotation of the caps relative to the wheel cover advances the caps into engagement with the lug nuts and continued rotation locks the caps in threaded engagement with the lug nuts. In an alternate embodiment, a threaded collar is snap fit into each aperture with the collar being locked against rotation and axial movement relative to the wheel cover. The external threads of the cap engage the threads of the collar. Limited translational movement of the collar within the aperture is permitted so that the caps can be adjusted relative to the wheel cover to facilitate registration of the caps with the lug nuts.

18 Claims, 4 Drawing Sheets

AXIAL WHEEL TRIM RETENTION WITH REDUCED STRESS

BACKGROUND OF THE INVENTION

1. Field of the Invention

This invention relates generally to wheel trim and more particularly to improvements in wheel cover retention systems.

2. Antecedents of the Invention

In the various systems for mounting wheel covers to vehicle wheels, the retentive forces between the wheel cover and wheel were applied either in radial or axial directions.

In some radial retention systems, as exemplified by U.S. Pat. Nos. 4,232,907 and 4,247,151, a plurality of sharp metal teeth or barbs on the ends of a spring leaf, engaged a wheel rim. The spring leaves were individually mounted to the wheel cover or comprised part of a metal grip ring which was received within an annular channel on the inner face of a wheel cover, as shown in U.S. Pat. No. 3,876,257, owned by the assignee of the present invention.

Radial retention systems suffered from certain disadvantages, among which were that the sharp barbs were prone to scratch paint from the surface of the wheel rim, exposing the rim to moisture and road salts, which resulted in accelerated corrosion.

Also, stresses were generated by the engagement between the spring leaves and the wheel rim. In conjunction with plastic wheel covers, these stresses often resulted in cracks or other failures. Further, due to the heat generated by the vehicle braking system and tire flex, plastic wheel covers often attained elevated temperatures, which degraded their structural rigidity. This resulted not only in distortion of plastic wheel covers, but also reduced grip and consequent loss of wheel covers as evidenced by the numerous wheel covers which have accumulated on the sides of our streets and highways.

In an attempt to avoid scratching of paint from wheel rims and the resultant corrosion, radial retention systems have also employed non-scratch leaf springs, as exemplified in U.S. Pat. No. 5,542,751, assigned to the assignee of the present invention. While non-scratch leaf springs reduced corrosion, they did not resist rotation of the wheel cover relative to the wheel. When such rotation occurred, contact between a valve stem and the wheel cover surfaces which defined a valve stem cut out was possible.

Axial retention systems have been exemplified by attempts to utilize vehicle lug nuts for mounting wheel covers as illustrated in U.S. Pat. No. 2,031,092 and U.S. Pat. No. 4,787,681. The placement of wheel cover components between the abutting surfaces of the lug nut and the wheel altered the characteristics of the wheel mounting arrangement itself. Further such retention systems often required wheel cover assembly steps as an aspect of the mounting procedure. The lug nuts were removed, a mounting portion of the wheel cover was placed against the wheel, the lug nuts were then reapplied and tightened against the mounting portion of the wheel cover. Thereafter, further portions of the wheel cover were attached to the mounting portion of the wheel cover.

Attempts have also been made to mount wheel covers by engaging threaded caps over portions of threaded lugs which projected beyond the ends of lug nuts, as illustrated in U.S. Pat. No. 4,895,415 and U.S. Pat. No. 5,222,785. The cap was tightened down against the end of the lug nut, compressing the wheel cover between the lug nut and the cap. The periphery of the wheel cover engaged the peripheral edge of the wheel rim. This engagement resulted in axial outward flexing of the periphery of the wheel cover. The engagement between the periphery of the wheel cover and the periphery of the wheel rim resulted in rubbing contact and the generation of noises, especially during the occurrence of wheel rim flex.

A further axial retention system is illustrated in U.S. Pat. No. 4,998,780 wherein a cap engaged external threads on a lug nut. While a fixed axial cap stop was not present in this system, contact between the wheel cover and the periphery of the wheel rim established a yieldable resistance for cap tightening. Axial tolerances in wheels, however, permitted axial variances in the order of 8 mm between the peripheral edge of the wheel rim and the lug apertures of a center disc of the wheel. This resulted in wide range of stress levels to which the wheel cover was subject.

Axial retention systems premised upon engagement of a wheel cover and a radial flange of a lug nut have also been proposed, as illustrated in U.S. Pat. Nos. 5,520,445, 5,297,854 and U.S. Pat. No. 4,842,339. These systems generated similar stress resulting from the engagement of the periphery of the wheel cover with the peripheral edge of the wheel rim, with the stress levels varying widely, due to the tolerances permitted in the axial distance between the peripheral edge of the wheel rim and the lug apertures.

In U.S. Pat. No. 3,356,421, a helical coil spring biased axial retentive force was employed, however, the engagement between the peripheral edge of the wheel cover and the wheel weight channel of the wheel rim provided the limit stop and the range of axial stress exerted on the wheel cover also varied with axial wheel tolerances.

Generally, the axial stresses exerted upon a wheel cover in conjunction with axial retention systems comprised the axially inward retentive force, applied by the cap or lug nut engagement along a lug circle surrounding the center of the wheel cover and the counterbalancing axially outward forces applied about the periphery of the wheel cover by engagement with the wheel rim.

Such stresses placed limitations upon the range of materials from which plastic wheel covers could be fabricated and generally required relatively stiff high grade plastics such as ABS+PC (acrylonitrile—butadiene—styrene/polycarbonate blend) with integral internal web reinforcement and a thickness in the order of approximately 3 mm. Lightweight and/or lower grade plastics or thinner wheel covers were not well suited to withstand the stresses and elevated temperatures encountered. Further, thin walled metal wheel covers were particularly unsuited for axial retention systems of the type disclosed in U.S. Pat. No. 4,998,780. The axially inward retentive forces generated a concave depression on the face of the wheel cover.

SUMMARY OF THE INVENTION

A wheel cover retention system includes a plurality of apertures positioned about a lug circle and registered with wheel lugs when the cover is mounted to a vehicle wheel. An internally threaded cap forms a connecting member which extends axially through each aperture for engagement with an anchor fixed relative to the wheel, such as, external threads on lug nuts which secure the wheel to a vehicle.

Each cap is axially adjustably fixed relative to the wheel cover through engagement between external threads on the cap and internal threads formed in the mating aperture of the wheel cover. Rotation of each cap relative to the wheel cover results in simultaneous engagement between the external threads with the wheel cover aperture and the internal threads with the lug nut threads.

In an alternate embodiment, the wheel cover apertures are not threaded and are oversized. A threaded collar is in snap fit engagement with each aperture. Each cap extends through a collar with the external threads on the cap engaging internal threads on the collar. The snap fit collars are mounted in the wheel cover apertures for limited translational movement so that the caps can be adjusted relative to the wheel cover to facilitate registration with the lug nuts.

From the foregoing compendium, it will be appreciated that it is an aspect of the present invention to provide an axial wheel cover retention system of the general character described which is not subject to the antecedent disadvantages aforementioned.

A feature of the present invention is to provide an axial wheel cover retention system of the general character described which significantly reduces mounting stresses in a wheel cover.

A consideration of the present invention is to provide an axial wheel cover retention system of the general character described which includes a cap for threaded engagement with external threads of a lug nut wherein the cap is axially adjustably fixed relative to the wheel cover.

Another aspect of the present invention is to provide an axial wheel cover retention system of the general character described which is relatively low in cost yet well suited to withstand the rigors of present day automotive applications.

A further feature of the present invention is to provide an axial wheel cover retention system of the general character described which is equally well suited for use in conjunction with wheel covers fabricated of plastic, metal or combinations thereof.

Another consideration of the present invention is to provide an axial wheel cover retention system of the general character described which is well suited for economical mass production fabrication.

A further feature of the present invention is to provide an axial wheel cover retention system of the general character described which facilitates simple and convenient removal and remounting of wheel covers by a motorist.

A further consideration of the present invention is to provide an axial wheel cover retention system of the general character described which is well suited for use with wheel covers fabricated of low density plastics, for reduction in total vehicle weight.

To provide an axial wheel cover retention system of the general character described wherein a lug nut engaging cap is in threaded engagement relative to a wheel cover for axial adjustment relative to the wheel cover is a feature of the present invention.

A still further aspect of the present invention is to provide an axial wheel cover retention system of the general character described wherein lug nut engaging caps are in threaded engagement relative to a wheel cover and with the caps being laterally displaceable relative to the wheel cover to facilitate registration between the caps and the lug nuts.

To provide a method of securely mounting a wheel cover to a wheel employing an axial retention system without applying an axial load to the face of the wheel cover is yet another feature of the present invention.

Other aspects, features and considerations in part will be obvious and in part will be pointed out hereinafter.

With these ends in view, the invention finds embodiment in various combinations of elements and arrangements of parts and series of steps by which the said aspects, features and considerations are achieved, all with reference to the accompanying drawings and the scope of which will be more particularly pointed out and indicated in the appended claims.

BRIEF DESCRIPTION OF THE DRAWINGS

In the accompanying drawings in which are shown some of the various exemplary embodiments of the invention.

DESCRIPTION OF THE PREFERRED EMBODIMENTS

Figure 1:
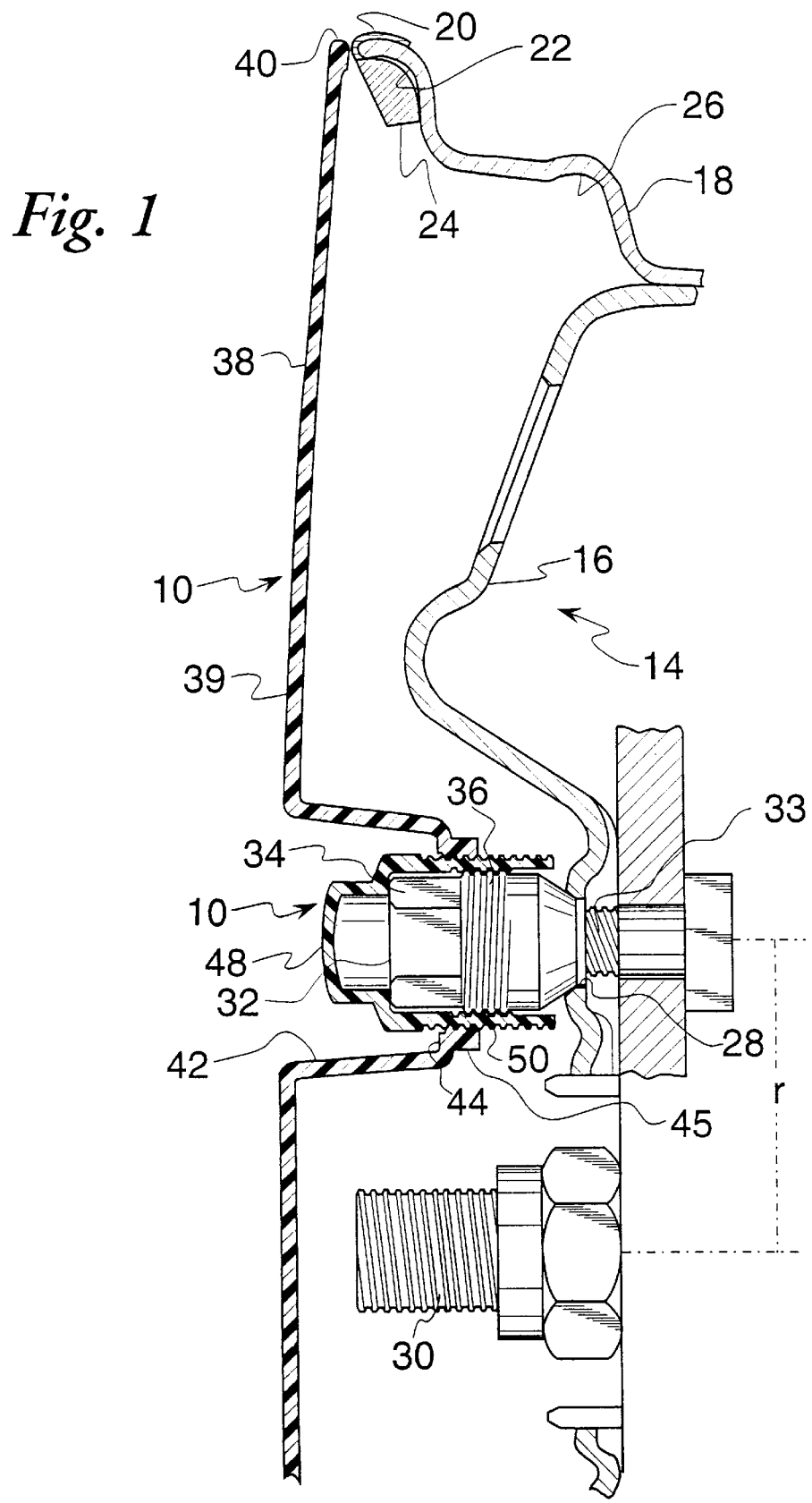
FIG. 1 is a fragmentary transverse sectional view through a wheel cover having a retention system with reduced axial stress constructed in accordance with the invention, with said wheel cover being mounted to a wheel.
Figure 2:
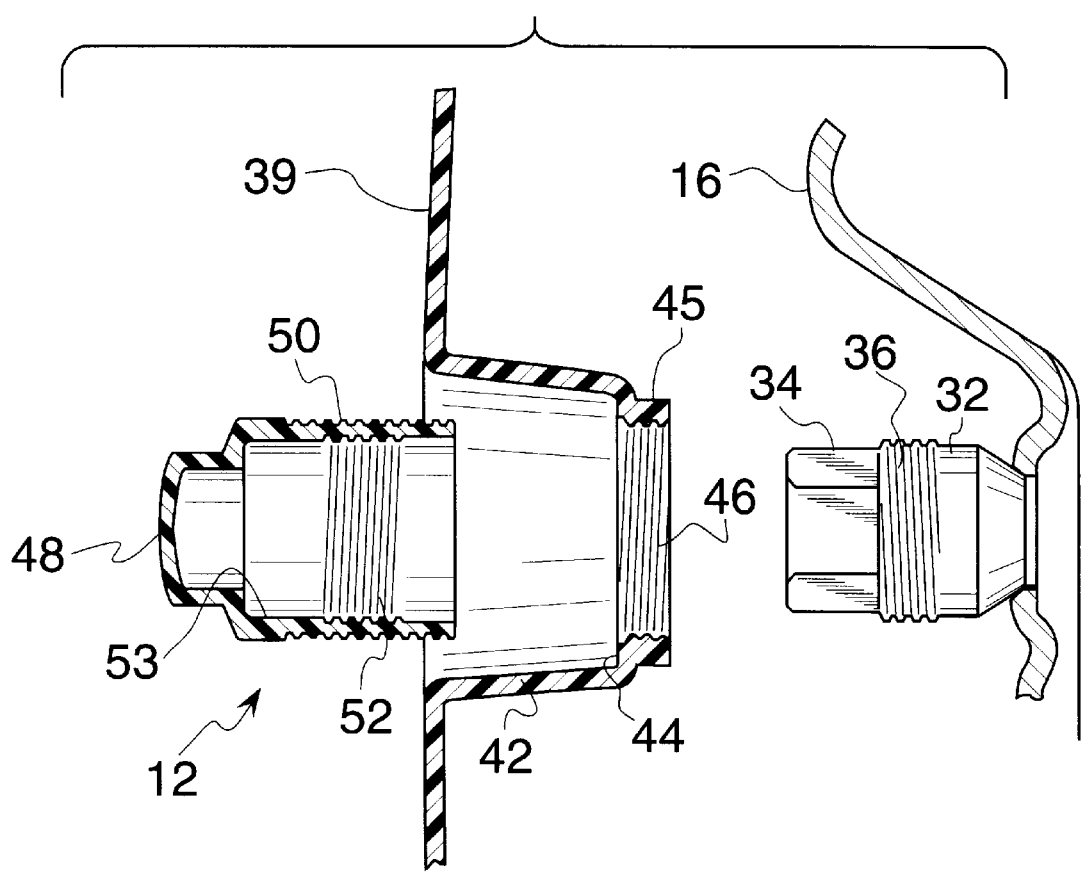
FIG. 2 is a fragmentary sectional exploded view of the retention system and illustrating a decorative lug nut cap having internal threads for engagement with external threads formed on a lug nut and external threads for simultaneous engagement with a threaded aperture formed in the wheel cover.

Referring now in detail to the drawings, the reference numeral 10 denotes generally a wheel cover having an axial retention system 12 constructed in accordance with and embodying the invention. The wheel cover 10 is illustrated as being mounted to a vehicle wheel 14 having a central disc portion 16 and a rim 18. The rim 18 includes a rim flange extending radially inwardly from a peripheral edge 20, to a wheel weight channel 22, which may carry one or more wheel weights 24 as may be required for balancing, through an annular safety hump or draw bead step 26.

The wheel 14 includes a plurality of lug apertures 28 equidistantly positioned about a lug circle having a radius "r" and centered about a vehicle axle or spindle 30, as the case may be. Securing the wheel 14 to the vehicle are a plurality of lug nuts 32, each of which includes internal threads for engagement with external threads of a lug 33. In a manner similar to that disclosed in the axial retention system of U.S. Pat. No. 4,998,780, each lug nut 32 includes a plurality of wrenching flats 34 adjacent its outer end with the outer surface of each lug nut 32 including a plurality of external anchoring threads 36 axially inward of the flats 34. When the lug nuts are tightened to mount the wheel 14, the anchoring threads are fixed relative to the wheel.

The wheel cover 10 generally comprises a molded plastic body 38 in the overall configuration of a circular disc having an outer face 39. The body 38 extends inwardly from a circular peripheral edge 40, which overlies the wheel weight channel 22, toward the center of the wheel cover. A plurality of vent openings (not shown) may be formed through the body.

A plurality of depressions or wells 42 are equidistantly spaced about the lug circle. Each well includes an inturned lip 44 at its distal end and the outer face 39 includes the outer surfaces of the well 42 and of the lip 44. The inturned lip 44 surrounds an internally threaded aperture 46 which extends axially inwardly through an integral annular skirt 45.

The wheel cover 10 is positioned about the wheel 14 such that each aperture 46 is substantially coaxial with the axis of its corresponding lug 33 and the axis of the lug nut 32 mounted thereon.

Received within each threaded aperture 46 is a connecting member which may comprise a decorative lug nut cap 48 having an externally threaded portion 50 in engagement with the internal threads of the aperture 46. A decorative center cap (not shown) may be mounted to the body 38, overlying a portion of the outer face 39 and concealing the wells 42 and the caps 48.

In a manner similar to that disclosed in U.S. Pat. No. 4,998,780, incorporated herein by reference, each lug nut cap 48 includes a plurality of internal threads 52 which mate with the anchoring threads 36 of the lug nut 32.

It should be appreciated that the external threads of the portion 50 extend from the axially inner end of the lug nut cap 48, a significant distance, encompassing more than one-half the axial length of the lug nut cap such that the lug nut caps 48 will be in threaded engagement with the threaded apertures 46, regardless of whether or not the internal threads 52 are in engagement with the lug nut threads 36. Thus, the wheel cover may be removed from the wheel without danger of loss of the lug nut caps 48, since they will remain in threaded engagement with the apertures 46.

Once the internal threads 52 are in engagement with the lug nut threads 36, rotation of the lug nut caps 48 simultaneously advances the lug nut caps axially inwardly relative to both the wheel and the wheel cover, without stressing the wheel cover body 38, until tight engagement is encountered with the lug nut threads 36. Since the lug nut caps 48 are axially adjustable relative to the wheel cover 10, and do not include radial flanges, the wheel cover may be secured to the wheel 14 without axial inward stress applied to the outer face 39 of the wheel cover body 38.

In order to prevent the lug nut caps 48 from inadvertently unthreading from the lug nuts 32, one or more of the internal threads 52 at the axially outer end of the threaded portion may be slightly deformed for an interference fit. Optionally, the axially outer lug nut threads 36 will engage an unthreaded hollow interior portion 53 of the lug nut caps 48 to provide both a limit stop and an interference fit. An alternative anti-rotation mechanism employs deformed external threads at the axially outer end of the threaded portion 50 for interference fit with the internal threads of the aperture 46.

As with the lug nut caps disclosed in U.S. Pat. No. 4,998,780, tightening of the lug nut caps may be achieved by providing hexagonal wrenching flats on the exterior surface of the lug nut caps dimensioned to be received within the socket of same lug nut wrench employed for tightening the lug nuts 32.

It should be appreciated that with the wheel cover 10 mounted to the wheel 14 pursuant to the retention system 12, an extremely secure retention is achieved which will render it virtually impossible for the wheel cover 10 to be accidently thrown off the wheel upon the occurrence of road shocks and the like and further, the wheel cover 10 will be mounted virtually free of axial retentive forces applied to the outer face 39 which would tend to distort or otherwise stress the wheel cover body 38.

Figure 3:
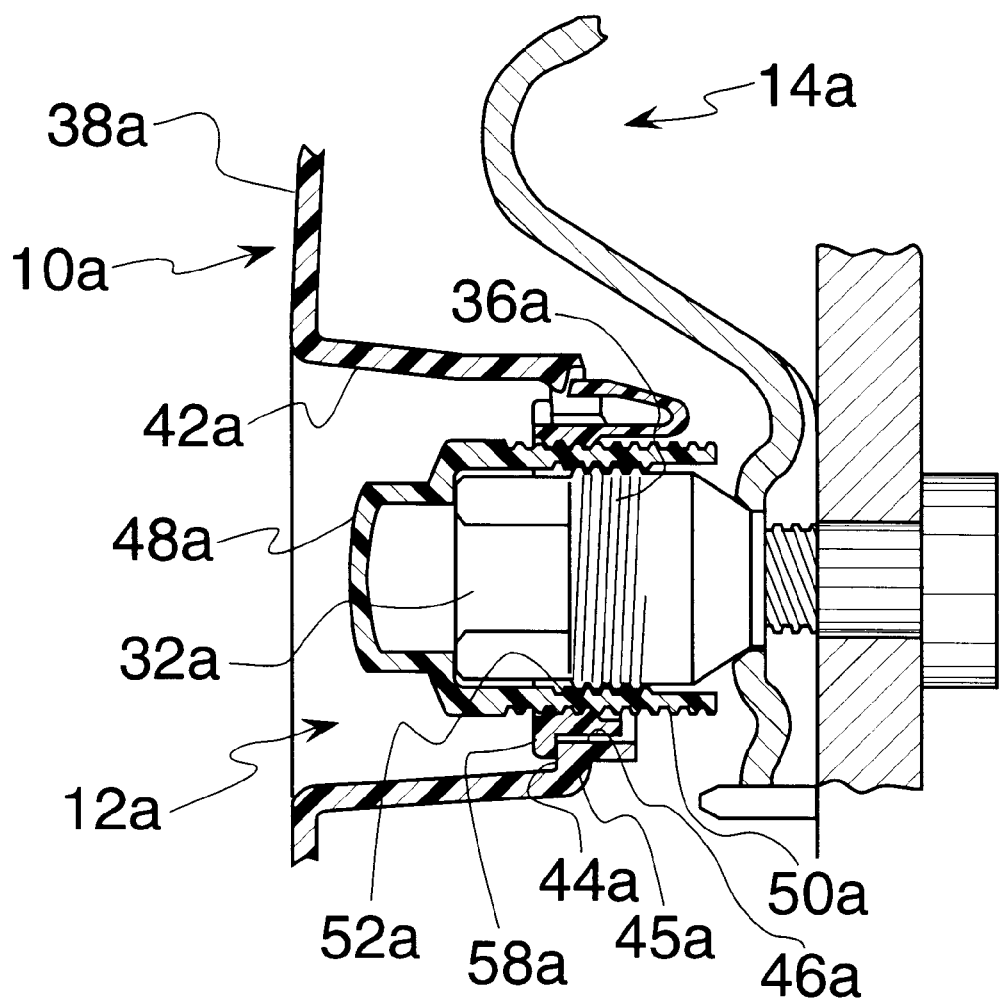
FIG. 3 is a fragmentary transverse sectional view through a further wheel cover having an axial retention system as constructed in accordance with an alternate embodiment of the invention wherein the external threads on the lug nut cap engage internal threads formed in a collar which is, in turn, snap fit into an aperture formed in the wheel cover.
Figure 4:
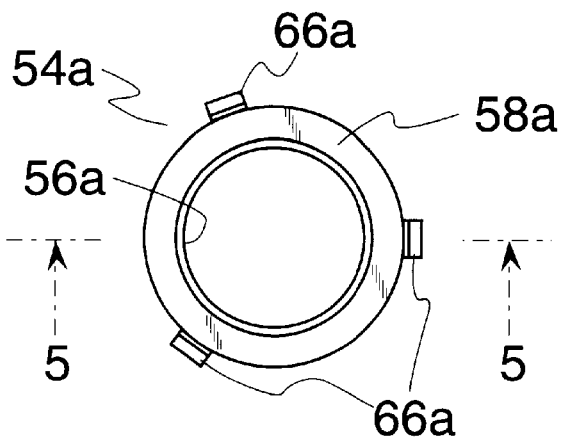
FIG. 4 is a top plan view of the collar.
Figure 5:
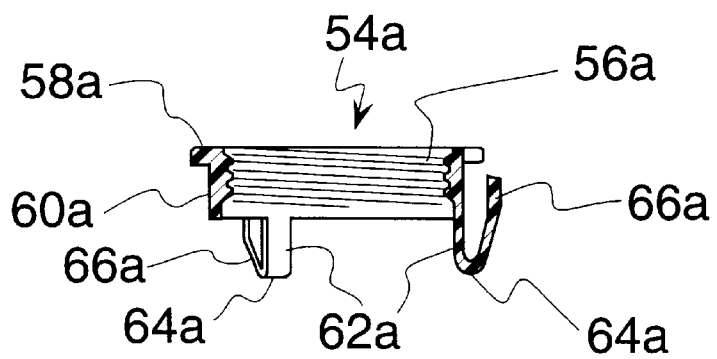
FIG. 5 is a sectional view through the collar, the same being taken along the line 5—5 of FIG. 4.
Figure 6:
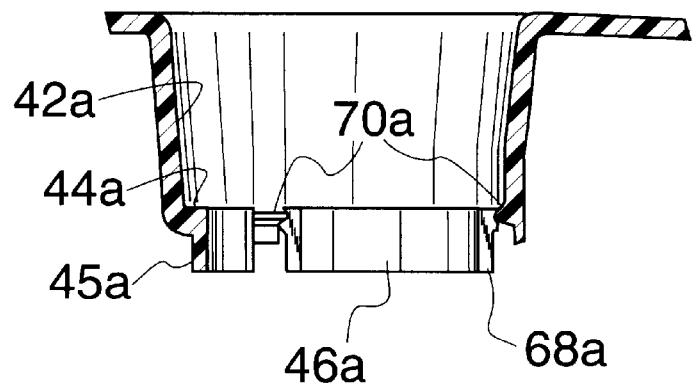
FIG. 6 is a fragmentary sectional view through a portion of wheel cover comprising a well which includes an aperture within which the collar is seated.

Referring now to FIGS. 3 through 5 wherein an alternate embodiment of the invention is disclosed, with the same reference numerals being employed to designate like components of the previous embodiment, however, bearing the suffix "a", there is disclosed a wheel cover 10a having a retention system 12a for mounting to a vehicle wheel 14a. The retention system 12a includes a plurality of lug nuts 32a identical to the lug nuts 32 previously described, with each lug nut including a plurality of external threads 36a.

The wheel cover 10a also includes a plurality of wells 42a similar in configuration to the wells 42 previously disclosed however, having a modified distal end including a modified interned lip 44a and a modified skirt 45a.

Retention system connecting members comprising a plurality of lug nut caps 48a (identical to the lug nut caps 48 previously disclosed) are provided. As with the caps 48, each cap has an externally threaded portion 50a and a plurality of internal threads 52a.

In order to facilitate engagement between the lug nut caps 48a and the externally threaded lug nuts 32a, the ends of each of the wells 42a includes an unthreaded aperture 46a which is larger than the apertures 46. A snap fit collar 54a is received within each of the unthreaded apertures 46a. The collar 54a includes an internally threaded bore 56a of a diameter and thread pitch which mates with the external threads of the portion 50a of the lug nut cap 48a.

An annular flange 58a is provided at the axially outer end of each collar 54a and a substantially annular skirt 60a extends axially inwardly. The diameter of the skirt 60a is less than the internal diameter of the aperture 46a to permit translational movement of the collar 54a relative to the wheel cover body 38a and thus facilitate registration and alignment of the lug nut caps 48a with the lug nuts 32a.

In order to lock the collar 54a in the aperture 46a and prevent rotation between the collar and the wheel cover body 38a, a plurality of integral spring latches 62a extend axially from the skirt 60a. The latches 62a are spaced equidistantly from one another along the periphery of the skirt.

Each latch 62a comprises a leg which extends axially inwardly from the skirt to a "U" bend 64a. From the bend 64a, the latch includes a terminal leg portion 66a which extends axially outwardly and radially outwardly.

The lip 44a and the skirt 45a of the well 42a include a plurality of cutout channels 68a for accommodating the latches 62a. The corresponding portion of the wall of the well 42a in registration with each cutout 68a includes a keeper 70a having an axially outer cam surface for bending the leg portion 66a radially inwardly to permit the collar to pass axially inwardly and be received within the aperture 46a. Once the leg portion 66a passes the cam surface, the leg portion springs outwardly. Each keeper 70a also includes an axially inner stop surface which abuts the end of the leg portion 66a to prevent the collar 54a from being removed.

Rotation of the collar 54a relative to wheel cover body 38a is prevented by engagement between the sides of each latch 62a and the edges of the lip 44a and skirt 45a which define the cutout channels 68a.

Since the aperture 46a is of larger diameter than the diameter of the skirt 60a, the collar 54a together with a lug nut cap 48a carried in the collar may be laterally moved within the well 42a relative to the body of the wheel cover to facilitate registration between the threads of the cap and the threads of the lug nut.

It should be appreciated that the axial retention system of the present invention is well suited for axial engagements other than between externally threaded portions of lug nuts and internally threaded portions of caps. For example, the present retention system may be easily employed in conjunction with connecting members such as caps which engage threaded portions of lugs extending beyond lug nuts e.g. as shown in U.S. Pat. No. 5,222,785, as well as axial retention systems having connecting members which snap fit over or otherwise engage portions of lug nuts.

Further, the invention is not limited to a threaded engagement between the connecting member and the wheel cover. A ratchet system may be employed between the connecting member and the wheel cover to adjustably fix the axial length which the connecting member extends inwardly from the wheel cover. Removal of the wheel cover may then be accomplished by rotating the connecting member to release the ratchet. Such system would be well suited for snap fit engagement with lugs or lug nuts.

As various changes might be made in the illustrative embodiments herein disclosed without departing from the spirit of the invention, it is to be understood that all matter herein described as shown in the accompanying drawings is to be interpreted as illustrative and not in a limiting sense.

Thus it will be seen that there is provided an axial wheel trim retention system which achieves the various aspects, features and considerations of the present invention and which is well suited to meet the conditions of practical usage.

Having thus described the invention there is claimed as new and desired to be secured by Letters Patent:

1. In a wheel having a wheel cover mounted thereto, the improvement comprising a wheel cover retention system for mounting the wheel cover to the wheel, the wheel including a plurality of anchor means fixed relative to the wheel, the wheel cover comprising a generally circular disc having a like plurality of apertures, the retention system comprising a coupling member carried in each aperture, a threaded engagement interconnecting each coupling member and the wheel cover, rotation of each coupling member relative to the wheel cover affecting adjustment of the axial position of each coupling member relative to its respective aperture, each coupling member being fixed to an anchor means, the axial position of each coupling member relative to its respective aperture being fixed in a position selected such that the wheel cover is secured to the wheel through engagement between each coupling member, the wheel cover and each anchor means substantially free of axial stress applied to the wheel cover through the coupling means.

2. A wheel cover retention system as constructed in accordance with claim 1 wherein the threaded engagement comprises external threads on the coupling member and mating internal threads formed in the aperture.

3. A wheel cover retention system as constructed in accordance with claim 1 wherein the threaded engagement comprises external threads on the coupling member, the retention system further including an annular collar, the collar having internal threads mating with the external threads on the coupling member, the collar being received in the aperture the collar being fixed against axial and rotational movements relative to the wheel cover.

4. A wheel cover retention system as constructed in accordance with claim 3 wherein the collar is mounted to the aperture for limited translational movement relative to the wheel cover, whereby registration of the coupling member and the anchor means is facilitated.

5. A wheel cover retention system as constructed in accordance with claim 1 wherein the coupling member comprises a decorative cap in simulation of a lug nut.

6. A wheel cover retention system as constructed in accordance with claim 1 wherein the means for fixing the coupling member to the anchor means in axially locking engagement comprises a threaded engagement.

7. A wheel cover retention system as constructed in accordance with claim 6 wherein the threaded engagement includes means providing an interference fit, whereby inadvertent loosening of the threaded engagement is precluded.

8. A method of mounting a wheel cover to a wheel, the wheel cover having an outer face, the wheel having a plurality of anchor means fixed relative to the wheel, the wheel cover including a plurality of apertures and a like plurality of coupling members configured for locking engagement with the anchor means, the coupling members being in threaded engagement with the apertures, the method comprising the steps of:

(a) positioning the wheel cover in front of the wheel with the apertures registered with the anchor means, (b) engaging each coupling member with its anchor means and, (c) adjusting the axial position of each coupling member relative to the wheel cover by rotating each coupling member relative to the wheel cover.

9. A method of mounting a wheel cover to a wheel in accordance with claim 8 wherein the anchor means are threaded and the coupling members are matingly threaded, the step of engaging each coupling member comprising:

(i) threadingly engaging each coupling member with each anchor means.

10. A method of mounting a wheel cover to a wheel in accordance with claim 8 wherein the step of engaging includes fixing the coupling members relative to the anchor means.

11. A method of mounting a wheel cover to a wheel in accordance with claim 10, wherein further rotation of the coupling member relative to the wheel cover is prevented by tightening the threaded engagement between the coupling member and the anchor means until an interference fit is obtained.

12. A method of mounting a wheel cover to a wheel in accordance with claim 8 wherein the coupling members are carried in the apertures, the step of positioning including registering the apertures and the coupling members with the anchor means.

13. A method of mounting a wheel cover to a wheel in accordance with claim 8 wherein step (b) and step (c) are performed simultaneously.

14. A wheel cover retention system as constructed in accordance with claim 13 wherein each anchor means comprises a lug nut, the means for engagement with the threaded portion of the anchor means comprising internal threads formed in the coupling member.

15. A wheel cover retention system as constructed in accordance with claim 13 wherein the apertures include internal threads, the threaded engagement for axial displacement of the coupling member comprising engagement between the external threads of the coupling member and the internal threads of the aperture.

16. A wheel cover retention system for mounting a wheel cover to a wheel, the wheel including anchor means fixed relative to the wheel, the wheel cover comprising a generally circular disc having at least one aperture, the retention system comprising a coupling member, the coupling member being carried in the aperture and means for fixing the coupling member to the anchor means in axially locking engagement, at least a portion of the coupling member including external threads, the retention system further including a threaded engagement interconnecting the coupling member and the wheel cover for axial displacement of the coupling member relative to the wheel cover.

17. A wheel cover retention system as constructed in accordance with claim 16 further including internal threads formed in the aperture, the internal threads mating with the external threads of the coupling member.

18. A wheel cover retention system as constructed in accordance with claim 16 further including an annular collar, the collar having internal threads mating with the external threads of the coupling member, the collar being received in the aperture and being fixed against axial and rotational movement relative to the wheel cover.

* * * * *